(12) United States Patent
Wen

(10) Patent No.: US 9,777,918 B1
(45) Date of Patent: Oct. 3, 2017

(54) LIGHTABLE COOLING FAN STRUCTURE

(71) Applicant: Nzxt Inc., City of Industry, CA (US)

(72) Inventor: Paul Wen, City of Industry, CA (US)

(73) Assignee: NZXT Inc., City of Industry, CA (US)

( * ) Notice: Subject to any disclaimer, the term of this patent is extended or adjusted under 35 U.S.C. 154(b) by 0 days.

(21) Appl. No.: 15/248,554

(22) Filed: Aug. 26, 2016

(51) Int. Cl.
| | |
|---|---|
| *F21V 29/00* | (2015.01) |
| *F21V 33/00* | (2006.01) |
| *F21V 19/00* | (2006.01) |
| *F21V 8/00* | (2006.01) |
| *F21V 7/00* | (2006.01) |
| *F21V 17/06* | (2006.01) |
| *F04D 29/52* | (2006.01) |
| *F21Y 105/18* | (2016.01) |
| *F21Y 115/10* | (2016.01) |

(52) U.S. Cl.
CPC ........ *F21V 33/0096* (2013.01); *F04D 29/522* (2013.01); *F21V 7/00* (2013.01); *F21V 17/06* (2013.01); *F21V 19/003* (2013.01); *G02B 6/0001* (2013.01); *F21Y 2105/18* (2016.08); *F21Y 2115/10* (2016.08)

(58) Field of Classification Search
CPC .... F21V 33/0096; F21V 19/003; F21V 17/06; F21V 7/00; G02B 6/0001; F04D 29/522; F21Y 2115/10; F21Y 2105/18
See application file for complete search history.

(56) References Cited

U.S. PATENT DOCUMENTS

| | | | |
|---|---|---|---|
| 8,057,071 B2 * | 11/2011 | He | F21V 29/677 362/234 |
| 2016/0152345 A1 * | 6/2016 | Molnar | B64C 39/024 244/39 |

* cited by examiner

*Primary Examiner* — Tracie Y Green
(74) *Attorney, Agent, or Firm* — Muncy, Geissler, Olds & Lowe, P.C.

(57) ABSTRACT

In a lightable fan structure for dissipating heat, a circuit board is arranged in a fan body, and the circuit board is sequentially provided with a first light-guiding frame and a second light-guiding frame, and the circuit board is provide with a plurality of side-light lighting elements. Every two side-light lighting elements is reversely arranged and spaced on a rim of the circuit board. A bottom of the first light-guiding frame is annually provided with a lighting reflection layer, and the side-light lighting elements are arranged below the lighting reflection layer. The lighting reflection layer reflects light sources of the side-light lighting elements to pass through an edge and a top of the first light-guiding frame and the second light-guiding frame, thereby uniformly scattering and forming a circular light source.

10 Claims, 5 Drawing Sheets

DETAILED DESCRIPTION OF THE
INVENTION

LIGHTABLE COOLING FAN STRUCTURE

BACKGROUND OF THE INVENTION

Field of the Invention

The present invention relates to a cooling fan structure, particularly to a lightable fan structure which guides light to uniform a light source.

Description of the Related Art

Nowadays, saving energy and reducing carbon is the most international topic to reduce global warming. Thus, a key target of industry technology is how to save electricity and consumables.

Since the technology of light emitting diodes (LEDs) develops and matures, high power LEDs become new and light lamps with high efficiency. Like LEDs, high power LEDs are energy-saving and environmental, comply with the topic of saving energy and reducing carbon and have advantages of small volumes, long lifetime, low power consumption, low heat loss, high brightness, fast starting speed, abundant color, and having environmental materials. Besides, the brightness of high power LEDs is the same to that of conventional lamps. The efficiency of high power LEDs is much higher than that of incandescent lamps and halogen bulbs and closer to that of high pressure sodium-lamps (HPS). The high power LEDs favor mass production, have high reliability and are easily fabricated into lamps according to the requirement of application. Presently, the high power LEDs have applied to illumination for street-lamps, factories, hyper markets, indoor and outdoor spaces or stadiums.

LEDs have applied to various illumination lamps. Since the application of the art aesthetic in life is more noticed, LEDs also apply to electronic products and peripheral products thereof, so as to increase additional value of the products and purchase will of consumers. For example, when a computer operates, high temperatures develop to cause damage to electronic elements in the computer and shorten their use life. As a result, a heat-dissipating fan is installed to dissipate internal heat sources of the computer to an exterior. In order to improve the beauty of the fan operating, LEDs apply to the heat-dissipating fan. Changing brightness, color, color temperature and winking states of LEDs can improve the effects of hinting, warning and creating atmospheres produced by the heat-dissipating fan. However, in the heat-dissipating fan with lighting effect, the light sources are shaded by a fan frame, a fan blade or the other assemblies whereby the brightness is not uniformly distributed. Alternatively, the light sources are shades by a part of the structure to cause the problem of discontinuous light sources.

To overcome the abovementioned problems, the present invention provides a lightable fan structure for dissipating heat, so as to solve the afore-mentioned problems of the prior art.

SUMMARY OF THE INVENTION

A primary objective of the present invention is to provide a lightable cooling fan, which continuously guides light in two stages to create the uniform and circular lighting effect.

Another objective of the present invention is to provide a lightable cooling fan structure, which uses side-light lighting elements to serve as passing paths of output light sources, and which uses a fill light design to cooperate with the light-guiding paths to form an uniform and continuous circular light source, thereby overcoming the problem of non-uniform distribution of the brightness of the light sources in a conventional technology or discontinuous light sources caused by the light sources shaded by a part of the structure.

A further objective of the present invention is to provide a lightable cooling fan structure, which easily assembles the whole product without additional locking tools, and which possesses convenience for operation.

To achieve the abovementioned objectives, the present invention provides a lightable cooling fan structure, which comprises a fan body, a circuit board, a first light-guiding frame and a second light-guiding frame. The circuit board is arranged in the fan body and provided with a plurality of side-light lighting elements, and every two side-light lighting elements is reversely arranged and spaced on a rim of the circuit board, and the side-light lighting elements generate light sources. A bottom of the first light-guiding frame is annually provided with a lighting reflection layer, and the first light-guiding frame is installed on the circuit board, and the side-light lighting elements are arranged below the lighting reflection layer. The second light-guiding frame is arranged on the first light-guiding frame, and the lighting reflection layer reflects the light sources of the side-light lighting elements to pass through an edge and a top of the first light-guiding frame and the second light-guiding frame, thereby uniformly scattering and forming a circular light source. Thus, the fan structure for dissipating heat creates the more gorgeous lighting effect for the circular light source.

Below, the embodiments are described in detail in cooperation with the drawings to make easily understood the technical contents, characteristics and accomplishments of the present invention.

DETAILED DESCRIPTION OF THE INVENTION

Nowadays, due to the development of technology industry, manufacturers endlessly improve the efficiency of original heat-dissipating fans and even produce multifunctional products in order to satisfy the requirement of consumers. Under situation of fierce competition in the market, the functions of heat-dissipating fans are much the same. If only the functions and practicability of the products are improved, the products are difficult to have competitiveness in the market. As a result, the manufacturers all improve design beauty of the products, especially for heat-dissipating fans with lighting effect. However, the lamplight design has the non-uniform brightness or bad lighting effect due to light sources shaded. Accordingly, the inventor researches and develops a product with a specific design to improve the drawbacks of existing products for many years. Then, the present invention details how to use a new lightable fan structure for dissipating heat to achieve the demand for gorgeous and uniform light.

Figure 1:
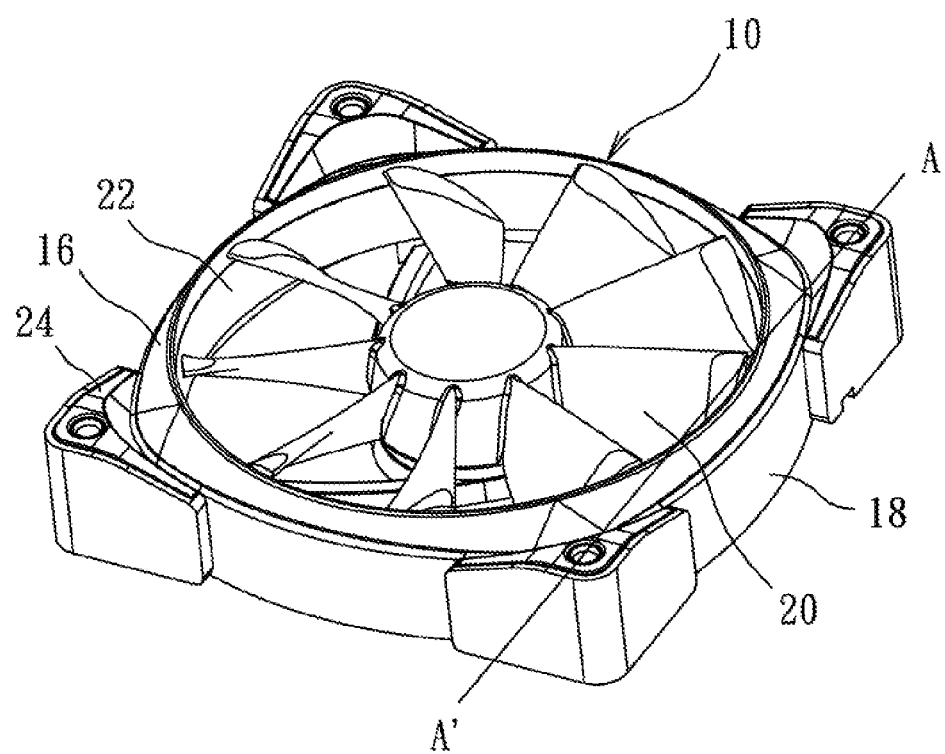
FIG. 1 is a diagram schematically showing a lightable fan structure for dissipating heat according to an embodiment of the present invention.
Figure 2:
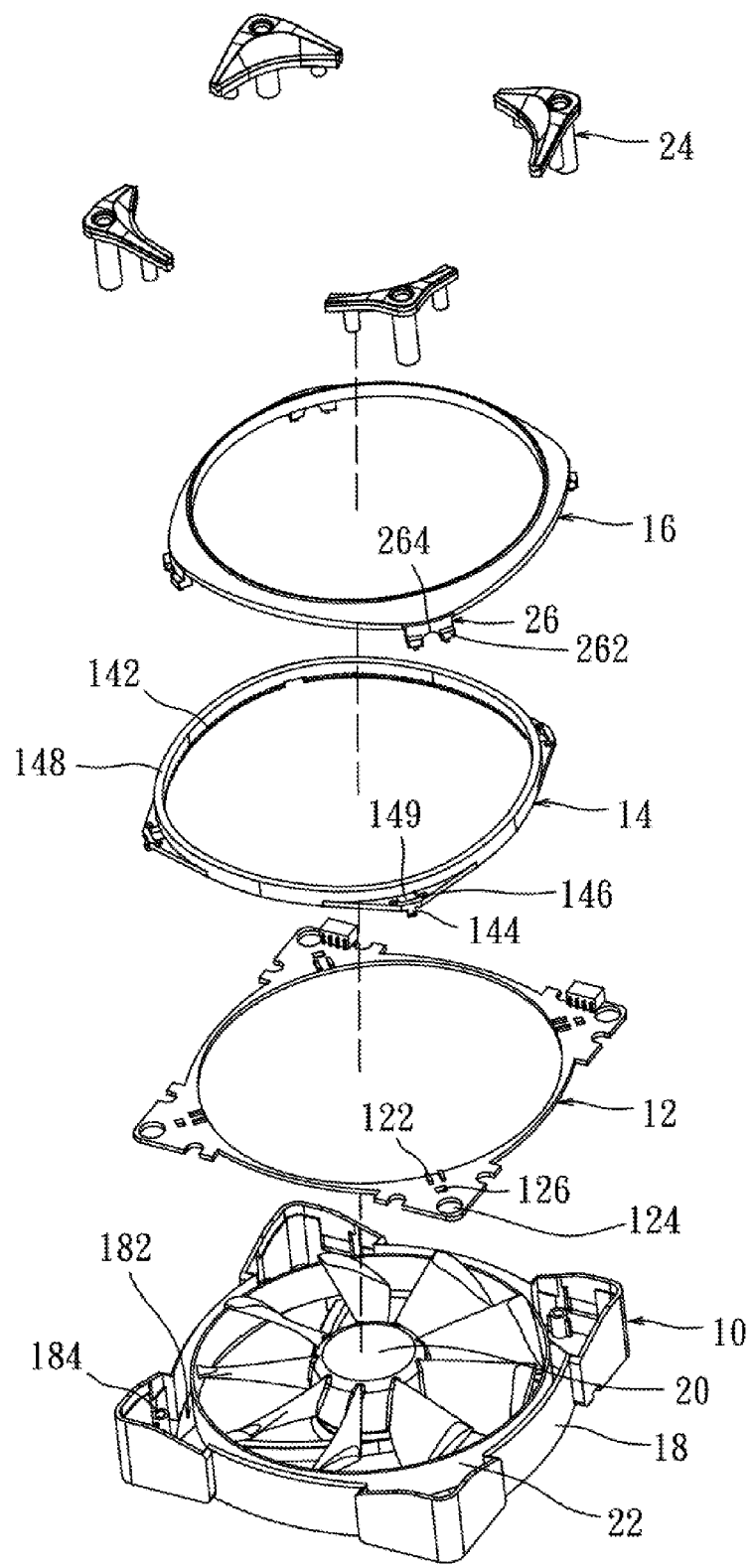
FIG. 2 is an exploded view of FIG. 1.
Figure 3:
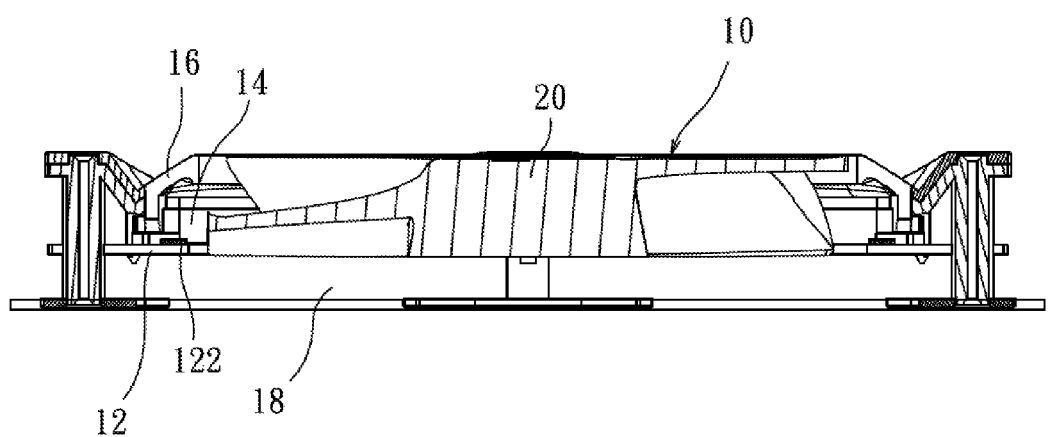
FIG. 3 is a sectional view taken along Line A-A' of FIG. 1.

Refer to FIG. 1, FIG. 2 and FIG. 3. FIG. 1 is a diagram schematically showing a lightable fan structure for dissipating heat according to an embodiment of the present invention. FIG. 2 is an exploded view of FIG. 1. FIG. 3 is a sectional view taken along Line A-A' of FIG. 1. Firstly, the components and connection relationship of the lightable fan structure for dissipating heat is detailed to realize the new design invented by the inventor. The lightable fan structure for dissipating heat comprises a fan body 10, a circuit board 12, a first light-guiding frame 14 and a second light-guiding frame 16. The circuit board 12 is arranged in the fan body 10. The fan body 10 further comprises a frame body 18 and a fan blade 20 arranged in the frame body 18. The frame body 18 has an installation recess 182 arranged at an outer side of the fan blade 20. The fan body 10 further comprises a collar 22 arranged at an outer side of the fan blade 20. The collar 22 is arranged between the installation recess 182 and the fan blade 20. The shape of the installation recess 182 matches that of the circuit board 12, whereby the circuit board 12 is arranged in the installation recess 182.

The circuit board 12 is fixed in the installation recess 182 and provided with a plurality of side-light lighting elements 122. Every two side-light lighting elements 122 is reversely arranged and spaced on a rim of the circuit board 12, and the side-light lighting elements 122 generate light sources. The present invention uses eight side-light lighting elements 122, and every two side-light lighting elements 122 constitutes one group and all the groups are spaced on a rim of the circuit board 12 at uniform intervals. Every two side-light lighting elements 122 is reversely arranged and spaced, whereby the eight side-light lighting elements 122 simultaneously generate light sources that can connect to each other to form a circular light source (as described below).

A bottom of the first light-guiding frame 14 is annually provided with a lighting reflection layer 142. The first light-guiding frame 14 is installed on the circuit board 12. The side-light lighting elements 122 is arranged on the lighting reflection layer 142. The first light-guiding frame 14 is a transparent light-guiding frame. The circuit board 12 is further provided with a plurality of first mortises 126, and the first light-guiding frame 14 is provided with a plurality of first tenons 144 which match the first mortises 126, the first mortises 126 are fastened with the first mortises 144 whereby the first light-guiding frame 14 is fixed on the circuit board 12. The fan structure for dissipating heat further comprises a plurality of fixing members 24 which fixes the circuit board 12 in the installation recess 182. Preferably, the fixing members 24 are spaced and fixed on the rim of the circuit board 12. The shapes of the fixing members 24 match those of the installation recess 182 and the circuit board 12. For example, the frame body 18 is further provided with a plurality of fixing portions 184, such as fixing columns. The fixing portions 184 are arranged in the installation recess 182, and the circuit board 12 is provided with a plurality of fixing holes 124 corresponding to the fixing portions 184. The fixing members 24 are hollow fixing columns. A hole diameter of the hollow fixing column is larger than a diameter of the fixing portion 184, whereby the fixing members 24 are sleeved around and fixed to the fixing portions 184. When assembling the fixing members 24, the fixing members 24 are correspondingly fixed to the fixing portions 184 through the fixing holes 124, whereby the circuit board 12 is fixed in the installation recess 182. Meanwhile, the fixing members 24 are used to fix an edge of the first light-guiding frame 14 so that the circuit board 12 is effectively and more stably touched to the first light-guiding frame 14.

Then, the second light-guiding frame 16 is arranged on the first light-guiding frame 14. The second light-guiding frame 16 is a semi-transparent sand surface light-guiding frame. A side of the second light-guiding frame 16 is further and annually provided with a plurality of fasteners 26 each comprising at least two second tenons 262, and a side of the first light-guiding frame 14 is further and annually provided with a plurality of second mortises 146. Every two second tenons 262 matches every two second mortises 146 and fastens every two the second mortises 146, whereby the second light-guiding frame 16 is fixed on the first light-guiding frame 14.

Figure 4:
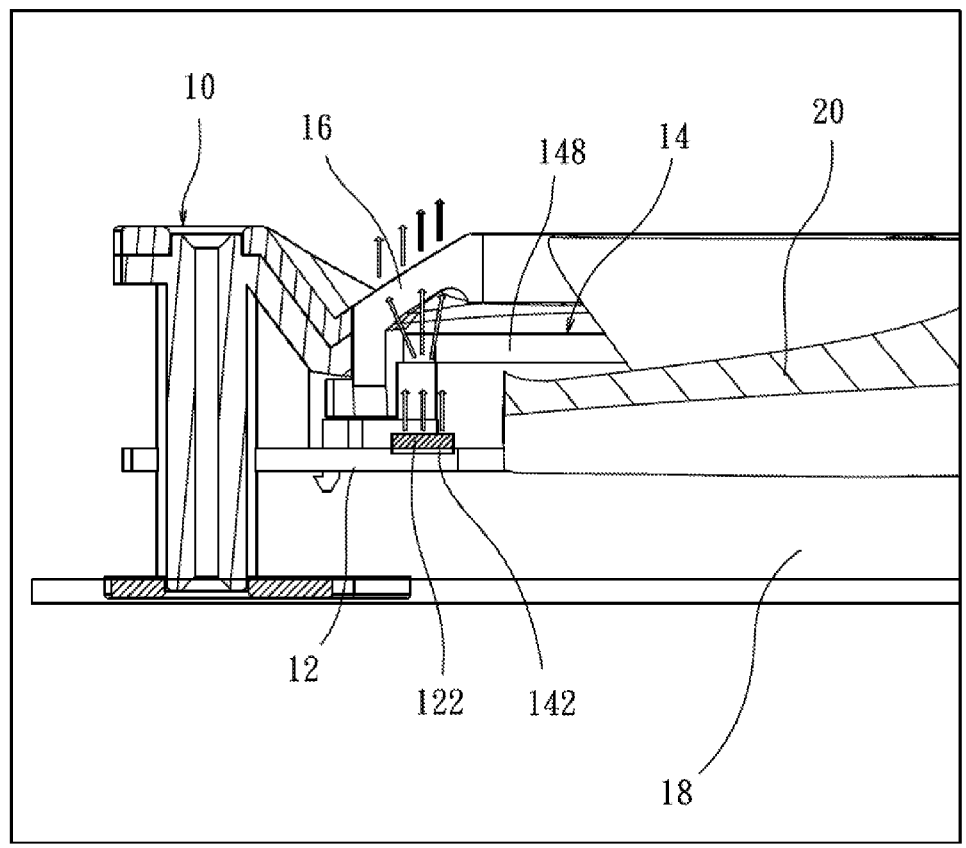
FIG. 4 is a diagram schematically showing light-passing paths according to an embodiment of the present invention.
Figure 5:
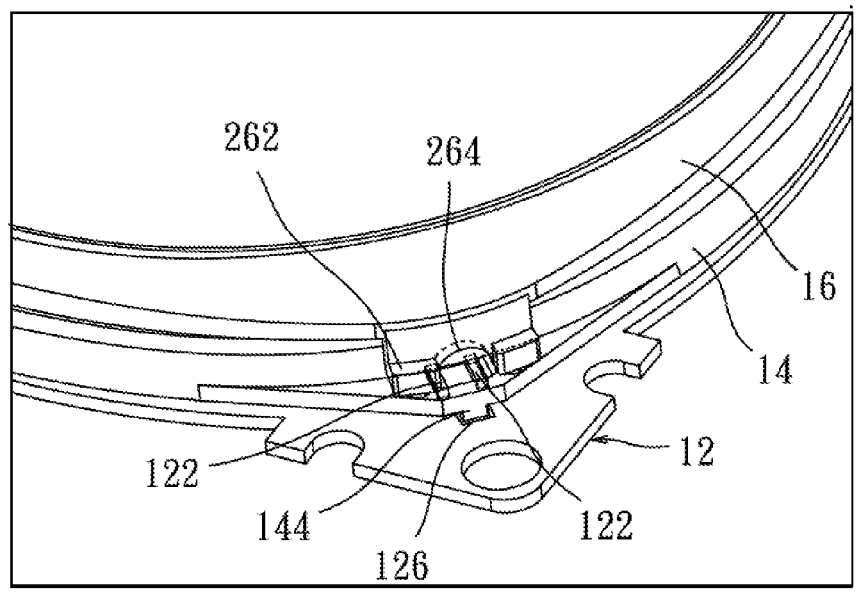
FIG. 5 is a diagram schematically showing an enlarged part of the lightable fan structure according to an embodiment of the present invention.

After realizing the abovementioned structure, refer to FIG. 4 which is a diagram schematically showing light-passing paths according to an embodiment of the present invention. When the fan structure for dissipating heat is driven, the side-light lighting elements 122 generate light sources. The lighting reflection layer 142 of the first light-guiding frame 14 reflects the light sources of the side-light lighting elements 122 to pass through an edge and a top 148 of the first light-guiding frame 14 and the second light-guiding frame 16, thereby uniformly scattering and forming a circular light source. It is noted that the side-light lighting elements 122 are spaced at uniform intervals on the rim of the circuit board 12, and that every two side-light lighting elements 122 is reversely arranged and spaced, whereby the side-light lighting elements 122 simultaneously generate the light sources that can connect each other to form the circular light source. The light sources uniformly scatter along light-guiding paths of the first light-guiding frame 14 and the second light-guiding frame 16 to form the circular light source. In order to uniformly guide the light source between two side-light lighting elements 122 to the second light-guiding frame 16, the first light-guiding frame 14 of the present invention is further provided with a plurality of opening holes 149, as shown in FIG. 5 which is a diagram schematically showing an enlarged part of the lightable fan structure according to an embodiment of the present invention. Each opening hole 149 corresponds to positions of every two side-light lighting elements 122, whereby the two side-light lighting elements 122 are arranged in the opening hole 149. Each fastener 26 is a transparent fastener comprising a transparent arc-concave portion 264 which corresponds to two side-light lighting elements 122, and the first light-guiding frame 14 is a transparent light-guiding frame, and the second light-guiding frame 16 is a semi-transparent sand surface light-guiding frame, and the transparent arc-concave portion 264 guides the reverse light source between the two side-light lighting elements 122 to connect to each other. In other words, the transparent arc-concave portion 264 is used to fill light, so that the second light-guiding frame 16 forms the uniform and continuous circular light source.

In life of jumping technology, people have more and more requirements for visual beauty. The illumination devices that can attract eyes of customers have to possess practicability and visual beauty. As a result, the side-light lighting elements 122 are realized with LEDs for different monochromatic lights or mixed lights, such that the entire fan structure for dissipating heat produces the gorgeous lighting effect.

In conclusion, the present invention uses the side-light lighting elements as passing paths to output the light sources, uses the fill light design to cooperate with two stages of continuous light-guiding paths, forms the uniform and continuous circular light source and creates the circular and gorgeous lighting effect. The present invention not only provides more business opportunities, but also possesses practicability and beauty. In addition, the present invention only requires the matchable fasteners to assemble the whole product without additional locking tools. For assemblers, the present invention operates easily, favors production and fabrication, satisfies the demands that consumers requires the lighting effect, and possesses strong market competitiveness.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A lightable fan structure for dissipating heat comprising:
   a fan body;
   a circuit board arranged in said fan body and provided with a plurality of side-light lighting elements, and every two said side-light lighting elements is reversely arranged and spaced on a rim of said circuit board, and said side-light lighting elements generate light sources;
   a first light-guiding frame with a bottom thereof annually provided with a lighting reflection layer, and said first light-guiding frame is installed on said circuit board, and said side-light lighting elements are arranged on said lighting reflection layer; and
   a second light-guiding frame arranged on said first light-guiding frame, and said lighting reflection layer reflects said light sources of said side-light lighting elements to pass through an edge and a top of said first light-guiding frame and said second light-guiding frame, thereby uniformly scattering and forming a circular light source.

2. The lightable fan structure for dissipating heat according to claim 1, wherein said first light-guiding frame is further provided with a plurality of opening holes each corresponding to positions of every two said side-light lighting elements, and two said side-light lighting elements are arranged in said opening hole.

3. The lightable fan structure for dissipating heat according to claim 1, wherein said fan body further comprises a frame body and a fan blade arranged in said frame body, and said frame body has an installation recess arranged at an outer side of said fan blade.

4. The lightable fan structure for dissipating heat according to claim 3, wherein said fan body further comprises a collar arranged at an outer side of said fan blade.

5. The lightable fan structure for dissipating heat according to claim 3, further comprising a plurality of fixing members which fixes said circuit board in said installation recess.

6. The lightable fan structure for dissipating heat according to claim 5, wherein said frame body is further provided with a plurality of fixing portions arranged in said installation recess, and said circuit board is provided with a plurality of fixing holes corresponding to said fixing portions, and said fixing members are correspondingly fixed to said fixing portions through said fixing holes, whereby said circuit board is fixed in said installation recess.

7. The lightable fan structure for dissipating heat according to claim 1, wherein said circuit board is further provided with a plurality of first mortises, and said first light-guiding frame is provided with a plurality of first tenons which match said first mortises, said first mortises are fastened with said first mortises whereby said first light-guiding frame is fixed on said circuit board.

8. The lightable fan structure for dissipating heat according to claim 1, wherein a side of said second light-guiding frame is further and annually provided with a plurality of fasteners each comprising at least two second tenons, and a side of said first light-guiding frame is further and annually provided with a plurality of second mortises, and every two said second tenons matches every two said second mortises and fastens every two said second mortises, whereby said second light-guiding frame is fixed on said first light-guiding frame.

9. The lightable fan structure for dissipating heat according to claim 8, wherein each said fastener is a transparent fastener comprising a transparent arc-concave portion which corresponds to two said side-light lighting elements, and said first light-guiding frame is a transparent light-guiding frame, and said second light-guiding frame is a semi-transparent sand surface light-guiding frame, and said transparent arc-concave portion guides said light source of two said side-light lighting elements, whereby said second light-guiding frame forms uniform said circular light source.

10. The lightable fan structure for dissipating heat according to claim 1, wherein said first light-guiding frame is a transparent light-guiding frame, and said second light-guiding frame is a semi-transparent sand surface light-guiding frame.

* * * * *